United States Patent [19]
Matsuoka et al.

[11] 4,430,016
[45] Feb. 7, 1984

[54] BALL JOINT

[75] Inventors: Chikara Matsuoka; Kouzi Sawada, both of Toyota; Takayoshi Sunayama, Hamamatsu, all of Japan

[73] Assignees: Toyota Jidosha Kogyo Kabushiki Kaisha; Ishikawa Tekko Kabushiki Kaisha, both of Japan

[21] Appl. No.: 269,843

[22] Filed: Jun. 3, 1981

[30] Foreign Application Priority Data

Jul. 8, 1980 [JP] Japan ............................ 55-95808[U]

[51] Int. Cl.³ .......................... B25G 3/00; F16D 1/00
[52] U.S. Cl. .................................... 403/40; 403/135; 403/132; 403/140
[58] Field of Search ............... 403/132, 133, 134, 135, 403/140, 139, 38, 39, 40

[56] References Cited

U.S. PATENT DOCUMENTS

| 2,027,560 | 1/1936 | Skillman | 403/139 |
| 2,527,787 | 10/1950 | Berger | 403/39 |
| 2,971,787 | 2/1961 | Lincoln | 403/39 |
| 2,996,308 | 8/1961 | Cislo | 403/134 X |
| 3,208,779 | 9/1965 | Sullivan | 403/134 |
| 3,231,299 | 1/1966 | Birney et al. | 403/139 |
| 3,560,035 | 2/1971 | Kindel | 403/140 |
| 3,647,249 | 3/1972 | Baba et al. | 403/140 |
| 4,318,627 | 3/1982 | Morin | 403/133 |

FOREIGN PATENT DOCUMENTS

| 857705 | 12/1952 | Fed. Rep. of Germany | 403/135 |
| 203783 | 6/1959 | Austria | 403/135 |

Primary Examiner—Wayne L. Shedd
Attorney, Agent, or Firm—James E. Nilles

[57] ABSTRACT

A ball joint having an annular bearing member made of a plastic and mounted in an inner space of a socket and slidably embracing a head portion of a ball stud. A plurality of grooves are formed in the outer peripheral surface of said bearing member contacting the inner surface of said inner space of said socket so as to extend in the axial direction of said ball stud. A multiplicity of minute convexities and concavities are formed in the spherical inner surface of said bearing member facing said head portion of said ball stud.

3 Claims, 5 Drawing Figures

BALL JOINT

BACKGROUND OF THE INVENTION

1. Field of the Invention

The present invention relates to a ball joint and, more particularly, to a ball joint for use in the steering mechanism or suspension mechanism of automobiles.

2. Description of the Prior Art

Generally, the ball joint for the above-mentioned uses has a socket which receives the head portion of a ball stud through the medium of a bearing member.

In the known ball joint of the type mentioned above, when a plastic is used as the material of the bearing member, a problem is caused due to a large difference in the coefficient of thermal expansion between the plastic and the metal used as the material of the socket and the ball stud. For instance, a polyester resin exhibits a coefficient of thermal expansion which is about $17 \times 10^{-5}/°C$. to $18 \times 10^{-5}/°C$., while iron exhibits a coefficient of thermal expansion generally ranging between $1.16 \times 10^{-5}/°C$. and $1.2 \times 10^{-5}/°C$. Therefore, in the ball joint in which the bearing member is fitted with a high pressure into the socket, the friction torque is increased as the bearing temperature rises. In addition, the friction torque itself has a large absolute value, resulting in a large static friction torque when the joint starts to operate. This increased static friction torque appears, for example, as an increased manipulating force for manipulating the steering wheel.

SUMMARY OF THE INVENTION

Accordingly, an object of the invention is to provide a ball joint in which the temperature-dependency of the friction torque is reduced to lower the absolute value of the rotational friction torque and to stabilize the operation of the ball joint, thereby to overcome the above-described problems of the prior art.

The above and other objects, as well as advantageous features of the invention will become clear from the following description of the preferred embodiments taken in conjunction with the accompanying drawings.

DESCRIPTION OF THE PREFERRED EMBODIMENTS

Figure 1:
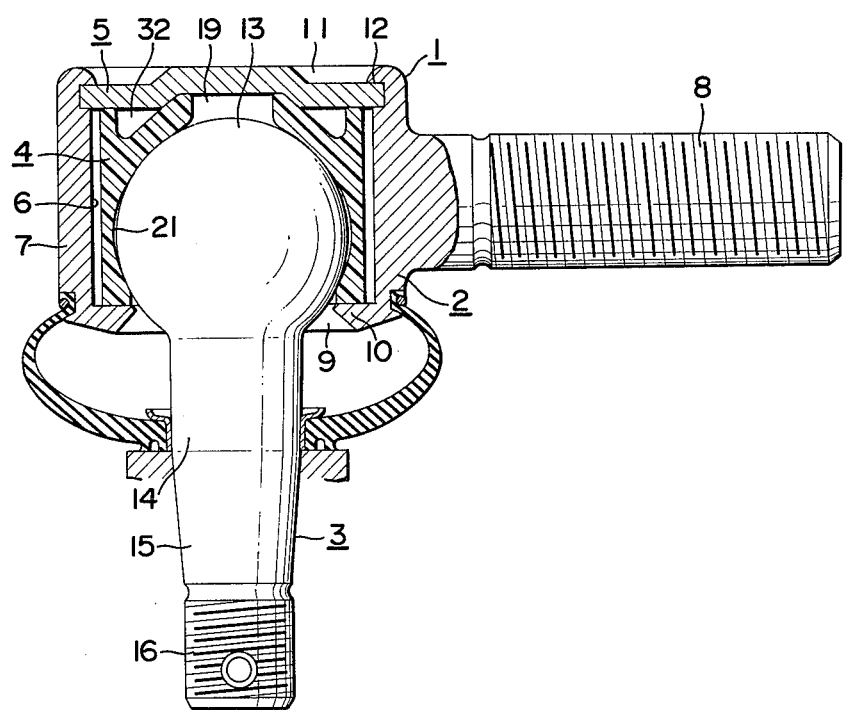
FIG. 1 is a partly sectioned side elevational view of a ball joint constructed in accordance with an embodiment of the invention.

Referring to FIG. 1, a ball joint generally designated at a reference numeral 1 ordinarily used in automobiles has a metallic socket 2, metalic ball stud 3, bearing member 4 made of a plastic and a metallic plug 5.

The socket 2 has a head portion 7 defining a cylindrical space 6, and a threaded shaft 8 provided with an external screw thread and extended from the head portion 7. The shaft 8 is connected to a tie rod which is not shown. The inner cylindrical space 6 has an inwardly bent shoulder portion 10 which is delimited by a lower opening 9 of the head portion 7. The head portion 7 is provided also with an upper opening 11 which is closed by the plug 5. The plug 5 is supported by a shoulder 12 which substantially defines the inner space 6, and is firmly secured by a caulking at the upper end of the head portion 7.

The aforementioned ball stud 3 has a spherical head portion 13 disposed in the inner space 6 of the socket 2 and supported by the bearing member 4 slidably in any direction, and a cylindrical rod-shaped shaft 14 which extends from the head portion 13 to project outwardly from the lower opening 9 of the socket 2. The shaft 14 has a conical portion 15 for fitting a knuckle arm or a relay rod (not shown) and a threaded portion 16 which is adapted to be engaged by a fastening nut.

Figure 2:
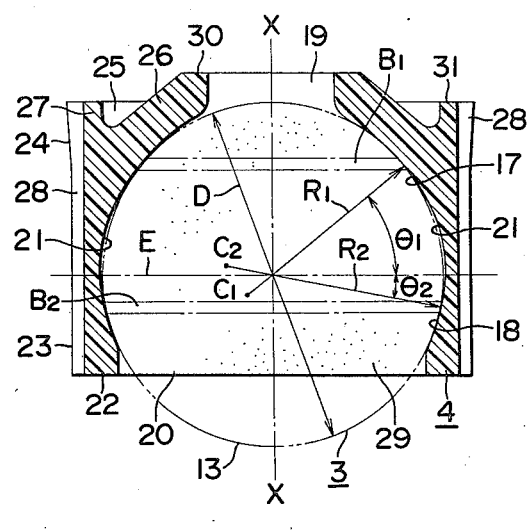
FIG. 2 is a vertical sectional view of a bearing member incorporated in the ball joint shown in FIG. 1.
Figure 3:
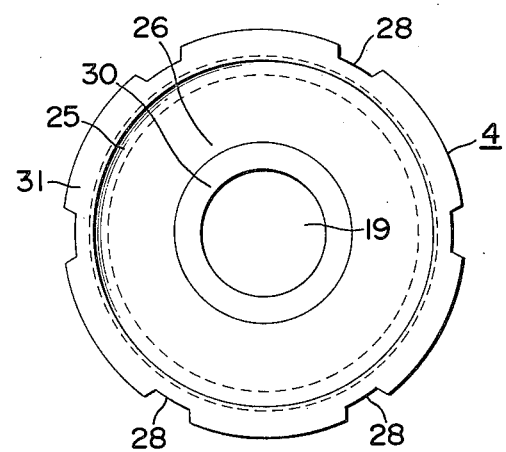
FIG. 3 is a plan view of the bearing member.

FIG. 2 shows the bearing member 4 in a freed state. The bearing member 4 has a generally annular shape and is provided with a spherical inner surface for embracing the head portion 13 of the ball stud 3. More specifically, the spherical inner surface is constituted by a pair of bullet-shaped bearing surfaces 17, 18 opposing to each other in the vertical direction so as to correspond to the portion of the head portion 13 above and below the equator line of the latter. The pair of bearing surfaces 17, 18 are obtained by rotating arcs of radii $R_1$ and $R_2$ around a common axis X—X, respectively.

Annular bearing zones or bands $B_1$, $B_2$ are formed in the upper and lower bearing surfaces 17, 18 on the circles of contact between the head portion 13 of a diameter D and respective bearing surfaces 17, 18. The breadth of these bearing bands are enlarged by a plastic deformation of the bearing material during the assembling.

Therefore, there are following relationships between the diameter D of the head portion 13 and the radii of curvature $R_1$, $R_2$ of the bearing surfaces 17, 18.

$$R_1 > \tfrac{1}{2}D \quad R_2 > \tfrac{1}{2}D$$

The centers $C_1$, $C_2$ and the latitudes $\theta_1$, $\theta_2$ of the radii $R_1$, $R_2$ of curvatures are so determined that the annular bearing bands $B_1$, $B_2$ are located substantially at the centers of the bearing surfaces 17, 18, respectively. The bearing surfaces 17, 18 have bullet like forms having cut ends defined by an upper small opening 19 and a lower large opening 20. Furthermore, these bearing surfaces are connected at their maximum-diameter portions on the equator line E so that annular pocket 21 for a lubricant is formed between the maximum-diameter portions and the head portion 13 of the ball stud 3.

A cylindrical outer peripheral surface 23 extending upwardly from the lower end surface 22 of the bearing member 4 has a diameter substantially equal to that of the cylindrical inner space 6 of the socket 2, and is shaped to have a tapered portion 24 the diameter of which is gradually increased in the upward direction. In addition, an annular recess 25 formed in conformity with the bearing band $B_1$ of the upper bearing surface 17 is formed at the upper end of the bearing member 4. A dome-shaped portion 26 extending along the upper bearing surface 17 is formed at the inside of the annular recess 25, while an annular wall 27 is formed at the outer side of the annular recess 25.

The bearing member 4 has a plurality of grooves 28 extending in the axial direction of the ball stud 3 contacting the surface of the inner space 6 of the socket 1, at a predetermined pitch.

In addition, minute convexities and concavities 29 are formed on the entire area of the spherical inner surface of the bearing member 4 facing the head portion 13 of the ball stud. The convexities and concavities 29 are formed by, for example, shaping the bearing surfaces 17, 18 of the bearing member 4 by a mould which has been subjected to a shot blast. The crests or tops of the convexities are rather gentle but the bottoms of the concavities are keen. The height and depth of the convexities and concavities are irregular, but the convexities and concavities as a whole present a surface roughness of about 30 to 40$\mu$.

The bearing member 4 is made of a high molecule material having a moderate elasticity and rigidity, as well as excellent self-lubricating nature, such as copolymer of ethylene tetrafluoride, acetal polymer, polyamide, polyester, polyurethane or the like.

The assembling is made in a manner stated below.

A lubricant is applied in advance to the assembling to the bearing member 4, particularly to the area around the equator line E. Then, the head portion 13 of the ball stud 3 is fitted in the bearing member 4. Although the large opening 20 at the lower side of the bearing member 4 has a diameter smaller than the diameter D of the head portion 13 of the ball stud 3, the opening 20 is enlarged forcibly to receive the head portion 13 as the latter is pressed against the bearing member 4.

The bearing member 4 now receiving the head portion 13 is inserted through the upper opening 11 into the inner space 6 of the socket 2 such that the shaft 14 of the ball stud 3 extends outwardly through the lower opening 9 of the socket 2. Then, the plug 5 is pressed at its lower face to the upper end of the bearing member 4 to fit the latter. The plug 5 contacts the upper face 30 of the dome-shaped portion 26 and the upper face 31 of the annular wall 27 to impart a bending deformation to the dome-shaped portion 26 thereby to back up the bearing member 4. Then, while preloading the bearing member between the shoulder portion 10 of the socket 2 and the plug 5, the plug 5 is caulked to the upper end of the socket 2 to form an annular space 32 between the annular recess 25 and the plug 5.

After the assembling, the upper and lower bearing surfaces 17, 18 of the bearing member 4, constituting a pair, support at their annular bearing belts, $B_1$, $B_2$ the head portion 13 of the ball stud 3 to form an annular pocket 21 on the equator line E of the head portion 13. This pocket 21 serves as a space for accomodating lubricant, from which the lubricant is supplied to the bearing belts $B_1$, $B_2$. As the bearing member 4 is preloaded, the breadths of the annular bearing belts $B_1$, $B_2$ are increased thanks to the elastic deformation of the material of the bearing member 4. A smooth operation of the ball joint is ensured by the product effect of the annular contact between the head portion 13 and the bearing surfaces 17, 18 and the presence of the pocket 21 serving as the lubricant storage space.

The annular wall 27 of the bearing member has an outside diameter greater than the inside diameter of the inner space 6 of the socket 2, so that the annular wall 27 is elastically deformed radially inwardly as a result of forcible insertion into the inner space 6 to preload the bearing member in the radial direction.

In consequence, the bearing member is preloaded in the vertical and radial directions to preload the head portion 13 of the ball stud 3 toward the center of the sphere to ensure a stable centering function and wear compensation function of the ball joint. The annular wall 27 is pressed against the cylindrical inner wall of the socket 2 to increase the friction between the bearing member 4 and the socket 2 thereby to prevent the bearing member 4 from rotating relatively to the socket 2 to enhance the stability of operation and improve the durability of the ball joint.

The annular wall 27 provides an additional function, thanks to the presence of the annular recess 25, to adjust its resiliency so as not to produce any excessive radial pressure.

Therefore, the fabrication of parts and assembling of these parts into a ball joint can be performed in quite an easy way. Furthermore, the annular recess 25 forms an annular space 32 between itself and the plug 5. This annular space 32 performs a kind of air cushion in cooperation with the bearing belts $B_1$, $B_2$. This air cushioning function, in combination with the resiliency of the bearing member and the preloading pressure acting toward the center, serves to absorb and relax the axial force applied to the ball stud 3 in the axial direction and in the direction perpendicular to the axial direction.

Any thermal expansion of the bearing member 4 is allowed by the presence of the groove 28 in the outer peripheral surface 23, so that the ball stud 3 is prevented from being tightened by an excessive force.

In the assembled state of the ball joint, the bearing member 4 is pressed by the socket 2, plug 5 and the head portion 13 of the ball stud 3, so that the convexities and concavities 29 are deformed. In consequence, a multiplicity of independent concavities and a multiplicity of spot-like convexities defined by the concavities are presented in the inner surface of the bearing member 4. The head portion 13 of the ball stud 3 is supported materially by these convexities. During the operation of the ball joint 1, the head portion 13 of the ball stud 3 is subjected to a load fluctuation so that the bearing member 4 is locally and instantaneously released from the pressure. In consequence, the concavities are instantaneously made continuous to permit the movement of the lubrication oil.

Hereinafter, a description will be made as to the result of a test conducted with the ball joint in accordance with the invention.

Figure 4:
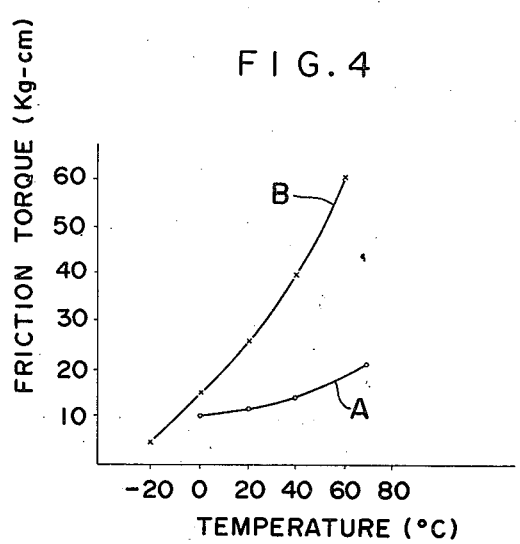
FIG. 4 shows a torque-temperature characteristic of the ball joint shown in FIG. 1.
Figure 5:
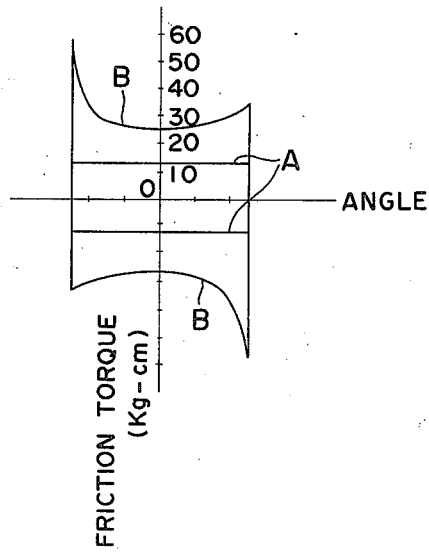
FIG. 5 shows the friction torque characteristic of the ball joint shown in FIG. 1.

The test was conducted with a bearing member 4, i.e. a member A having the grooves 28 and minute convexities, concavities, and a bearing member B of the conventional type having no groove 28 nor convexities and concavities 29. Concerning the temperature-dependency, the member A in accordance with the invention showed a much smaller friction torque at high temperature as compared with the conventional member B, as will be seen from FIG. 4. Also, as to the friction torque itself, the member A of the invention showed a much smaller absolute value of the friction torque and static friction torque at the time of start up over the conventional member B, as will be understood from FIG. 5.

According to the invention, the bearing member is provided in its outer peripheral surface contacting the inner surface of the ball socket with a plurality of grooves extending in the axial direction of the ball stud to absorb and permit the thermal expansion of the bearing member. In consequence, excessive tightening of the ball stud is avoided to diminish the temperature-dependency of the friction torque.

Furthermore, the minute convexities and concavities formed in the inner spherical surface embracing the head portion of the ball stud improve the lubrication by the lubricant to reduce the starting torque and to diminish the fluctuation of the friction torque thereby to enhance the stability of operation of the ball joint.

In consequence, the ball joint can reduce, when used in steering mechanism or suspension mechanism of an automobile, the required manipulation force or resistance against the operation. For instance, the manual force for manipulating the steering wheel can be very much decreased.

What is claimed is:

1. A ball joint (1) comprising:

a socket (2) having a cylindrical bore (6) having openings (9, 11) at opposite ends and an inwardly extending shoulder (10) at one opening (9) of said bore (6);

a ball stud (3) having a generally spherical head portion (13) disposed in said bore (6) and having a shaft (14) extending outwardly through said one opening (9);

an elastic bearing member (4) mounted in said bore (6) and comprising an annular hole having openings (19, 20) at opposite ends and defined by a generally spherical inner surface (17, 18) which slidably embraces said spherical head portion (13) of said ball stud (3) and cooperates therewith in an equatorial region (E) to define a lubricant receiving pocket (21);

one end of said bearing member (4) having a surface (22) engaging said shoulder (10) in said socket (2);

the other end of said bearing member (4) having an annular recess (25) therein around the opening (19) of said annular hole, a radial face (31) around said recess (25), and an annular dome-shaped projecting portion (26) between said recess (25) and said opening (19);

said bearing member (4) comprising a cylindrical outer peripheral surface (23) of substantially the same diameter as and engaged with the wall of said cylindrical bore (6), an elastically deformable tapered portion (24) of increasing diameter relative to said cylindrical surface (23) and engaged with the wall of said cylindrical bore (6) imparting preloading pressure to said bearing member in a radial direction to thereby preload said spherical head portion, and a plurality of radially spaced apart axially extending grooves (28) between the ends of said bearing member (4) and extending radially inwardly partially into said bearing member from said outer peripheral surface (23) including tapered portion (24);

and a rigid plug (5) rigidly connected to said socket (2) and engaged with said radial face (31) and with said annular dome-shaped portion (26) of said bearing member (4) to resiliently impart a predetermined amount of preloading pressure to said bearing member (4) in a vertical direction to thereby preload said spherical head portion (13) of said ball stud (3);

said plug (5) cooperating with said annular recess (25) to define a space (32) serving as an air cushion.

2. A ball joint according to claim 1 wherein said inner surface of said annular hole of said bearing member facing said head portion of said ball stud is provided with a multiplicity of minute convexities and concavities for receiving lubricant therein.

3. A ball joint according to claim 2 wherein said convexities and concavities present a surface roughness of about 30 to 40μ.

* * * * *